US012125652B2

(12) United States Patent
Jia et al.

(10) Patent No.: US 12,125,652 B2
(45) Date of Patent: Oct. 22, 2024

(54) CONTROL DEVICE AND METHOD FOR CONTACTOR

(71) Applicant: SCHNEIDER ELECTRIC INDUSTRIES SAS, Rueil Malmaison (FR)

(72) Inventors: Yongpeng Jia, Shanghai (CN); Vincent Geffroy, Shanghai (CN); Jiezhao Wang, Shanghai (CN); Juan Xie, Shanghai (CN)

(73) Assignee: Schneider Electric Industries SAS, Rueil Malmaison (FR)

( * ) Notice: Subject to any disclaimer, the term of this patent is extended or adjusted under 35 U.S.C. 154(b) by 314 days.

(21) Appl. No.: 17/786,966

(22) PCT Filed: Dec. 18, 2020

(86) PCT No.: PCT/CN2020/137691
§ 371 (c)(1),
(2) Date: Jun. 17, 2022

(87) PCT Pub. No.: WO2021/121400
PCT Pub. Date: Jun. 24, 2021

(65) Prior Publication Data

US 2023/0040517 A1 Feb. 9, 2023

(30) Foreign Application Priority Data

Dec. 20, 2019 (CN) ......................... 201911329445.3

(51) Int. Cl.

*H01H 47/32* (2006.01)
*H01H 47/02* (2006.01)
*H01H 50/54* (2006.01)

(52) U.S. Cl.

CPC ............ *H01H 47/32* (2013.01); *H01H 47/02* (2013.01); *H01H 50/54* (2013.01)

(58) Field of Classification Search

CPC ........ H01H 47/02; H01H 47/04; H01H 47/32; H01H 50/54; H03K 3/012; H03K 17/56;
(Continued)

(56) References Cited

U.S. PATENT DOCUMENTS

| | | | | |
|---|---|---|---|---|
| 7,593,212 | B1 * | 9/2009 | Toth ................... | G05D 23/1902 361/160 |
| 2020/0328684 | A1 * | 10/2020 | Escudero Rodriguez ................... | H02M 3/3353 |
| 2023/0029408 | A1 * | 1/2023 | Wang ..................... | H01H 47/32 |

FOREIGN PATENT DOCUMENTS

| | | | |
|---|---|---|---|
| CN | 202977308 | U | 6/2013 |
| CN | 203895364 | U * | 10/2014 |

(Continued)

OTHER PUBLICATIONS

International Search Report mailed Mar. 17, 2021 for International Patent Application No. PCT/CN2020/137691, 5 pages.

*Primary Examiner* — Jared Fureman
*Assistant Examiner* — Nicolas Bellido
(74) *Attorney, Agent, or Firm* — Locke Lord LLP

(57) ABSTRACT

Embodiments of the present disclosure relate to a control device and method for a contactor. The control device comprises a first high-side control unit, a second high-side control unit, a first low-side control unit and a second low-side control unit. The first high-side control unit and the second high-side control unit respectively connect a first magnetic unit and a second magnetic unit of the contactor to a power supply. The first low-side control unit is connected between the first magnetic unit and a reference voltage node, and the second low-side control unit is connected between the second magnetic unit and the reference voltage node. The control device further comprises a freewheel unit connected to the first magnetic unit and the second magnetic unit. The control device further comprises a controller. The
(Continued)

controller is used to control operations of the control units so that in a state that at least one magnetic unit of the first magnetic unit and the second magnetic unit is disconnected from the power supply, a current of the at least one magnetic unit flows through the freewheel unit. According to embodiments of the present disclosure, the contactor may be made more energy-saving, and the operation cost may be reduced.

17 Claims, 3 Drawing Sheets

(58) Field of Classification Search
CPC .. H03K 2217/0063; H03K 2217/0072; H02M 1/36
See application file for complete search history.

(56) References Cited

FOREIGN PATENT DOCUMENTS

| | | | |
|---|---|---|---|
| CN | 107170644 | A | 9/2017 |
| CN | 108735552 | A | 11/2018 |
| EP | 0049188 | A2 | 4/1982 |
| JP | 0973850 | A | 3/1997 |

* cited by examiner

CONTROL DEVICE AND METHOD FOR CONTACTOR

FIELD

Embodiments of the present disclosure generally relate to the field of contactors, and more specifically to a control device for a contactor and a method for controlling the contactor.

BACKGROUND

In industrial application, by allowing an electrical current to flow through a coil to generate a magnetic field, a contactor causes contacts of the contactor to be closed, so as to achieve an object of controlling a load. A conventional contactor employs a flyback circuit-based coil control solution or a low side coil control solution. However, these solutions cause a large power consumption so that a temperature of the contactor rises rapidly, which shortens the service life of the contactor. In addition, these solutions are difficult to design and have a long verification cycle, so that it is uneasy for them to achieve a diagnostic function.

SUMMARY

Embodiments of the present disclosure provide an apparatus and method for controlling a contactor, aiming to at least partly solve the above and/or other potential problems existing in design of contactors.

In a first aspect, embodiments of the present disclosure relate to a control device for a contactor. The control device comprises a first high-side control unit and a second high-side control unit which respectively connect a first magnetic unit and a second magnetic unit of the contactor to a power supply; a first low-side control unit and a second low-side control unit, the first low-side control unit being connected between the first magnetic unit and a reference voltage node, and the second low-side control unit being connected between the second magnetic unit and the reference voltage node; a freewheel unit connected to the first magnetic unit and the second magnetic unit; and a controller for controlling operations of the first high-side control unit, the second high-side control unit, the first low-side control unit and the second low-side control unit so that in a state that at least one magnetic unit of the first magnetic unit and the second magnetic unit is disconnected from the power supply, a current of the at least one magnetic unit flows through the freewheel unit.

According to embodiments of the present disclosure, energy transfer and transmission may be achieved in an inrush phase and a holding phase of the contactor, thereby reducing the energy consumption of the contactor and optimizing the working performance of the contactor.

In some embodiments, the control device further comprises: a first current monitor configured to monitor a first current flowing through the first magnetic unit, the controller being configured to control the operation of the second low-side control unit based on the first current.

In some embodiments, the control device further comprises: a second current monitor configured to monitor a second current flowing through the second magnetic unit, the controller being configured to control the operation of the second high-side control unit based on the second current.

In some embodiments, the controller is configured to switch on the first low-side control unit during an inrush phase of the contactor so that the current flows through the first magnetic unit and the first low-side control unit.

In some embodiments, the controller is configured to switch on the second low-side control unit during a holding phase of the contactor so that the current flows through the second magnetic unit and the second low-side control unit.

In some embodiments, the freewheel unit comprises a freewheel diode.

In some embodiments, the first high-side control unit comprises a high-side inrush switch; the first low-side control unit comprises a low-side inrush switch; the first magnetic unit comprises an inrush coil; the second high-side control unit comprises a high-side holding switch; the second low-side control unit comprises a low-side holding switch; and the second magnetic unit comprises a holding coil.

In some embodiments, the control device further comprises a first voltage stabilization protection unit and a second voltage stabilization protection unit, the first voltage stabilization protection unit is connected between the inrush coil and the reference voltage node, and the second voltage stabilization protection unit is connected between the holding coil and the reference voltage node.

In a second aspect, embodiments of the present invention relate to a contactor. The contactor comprises the control device according to the first aspect.

In a third aspect, embodiments of the present invention relate to a method of controlling a contactor. The contactor comprises a first magnetic unit and a second magnetic unit. The method comprises: switching on a first low-side control unit and a first high-side control unit such that a current flows through the first high-side control unit, the first magnetic unit and the first low-side control unit, wherein the first high-side control unit connects the first magnetic unit to a power supply, and the first low-side control unit is connected between the first magnetic unit and a reference voltage node; switching off the first high-side control unit such that a freewheel current is formed between the first magnetic unit, the first low-side control unit, the reference voltage node, and a freewheel unit, wherein the freewheel unit is connected to the first magnetic unit and the second magnetic unit; and switching on a second low-side control unit such that the freewheel current is induced to the second magnetic unit, wherein the second low-side control unit is connected between the second magnetic unit and the reference voltage node.

In some embodiments, the method further comprises switching off the first low-side control unit after switching on the second low-side control unit.

In some embodiments, the method further comprises switching on a second high-side control unit after switching off the first low-side control unit, wherein the second high-side control unit is used to connect the second magnetic unit of the contactor to the power supply.

In some embodiments, switching on the first low-side control unit and the first high-side control unit comprises: switching on the first high-side control unit after switching on the first low-side control unit for a time threshold.

In some embodiments, switching off the first low-side control unit comprises: switching off the first low-side control unit in response to a first current flowing through the first magnetic unit being lower than a first threshold.

In some embodiments, switching on the second high-side control unit comprises switching on the second high-side control unit in response to a second current flowing through the second magnetic unit being greater than a second threshold.

In some embodiments, the first magnetic unit comprises an inrush coil; the second magnetic unit comprises a holding coil; the first low-side control unit comprises a low-side inrush switch; the first high-side control unit comprises a high-side inrush switch; the second low-side control unit comprises a low-side holding switch; and the freewheel unit comprises a freewheel diode.

In some embodiments, the second high-side control unit comprises a high-side holding switch.

BRIEF DESCRIPTION OF THE DRAWINGS

Through the following detailed description with reference to the accompanying drawings, the above and other objectives, features, and advantages of embodiments of the present disclosure will become easier to understand. In the accompanying drawings, a plurality of embodiments of the present disclosure will be described in an exemplary and non-limiting manner, wherein.

DETAILED DESCRIPTION OF EMBODIMENTS

Figure 1:
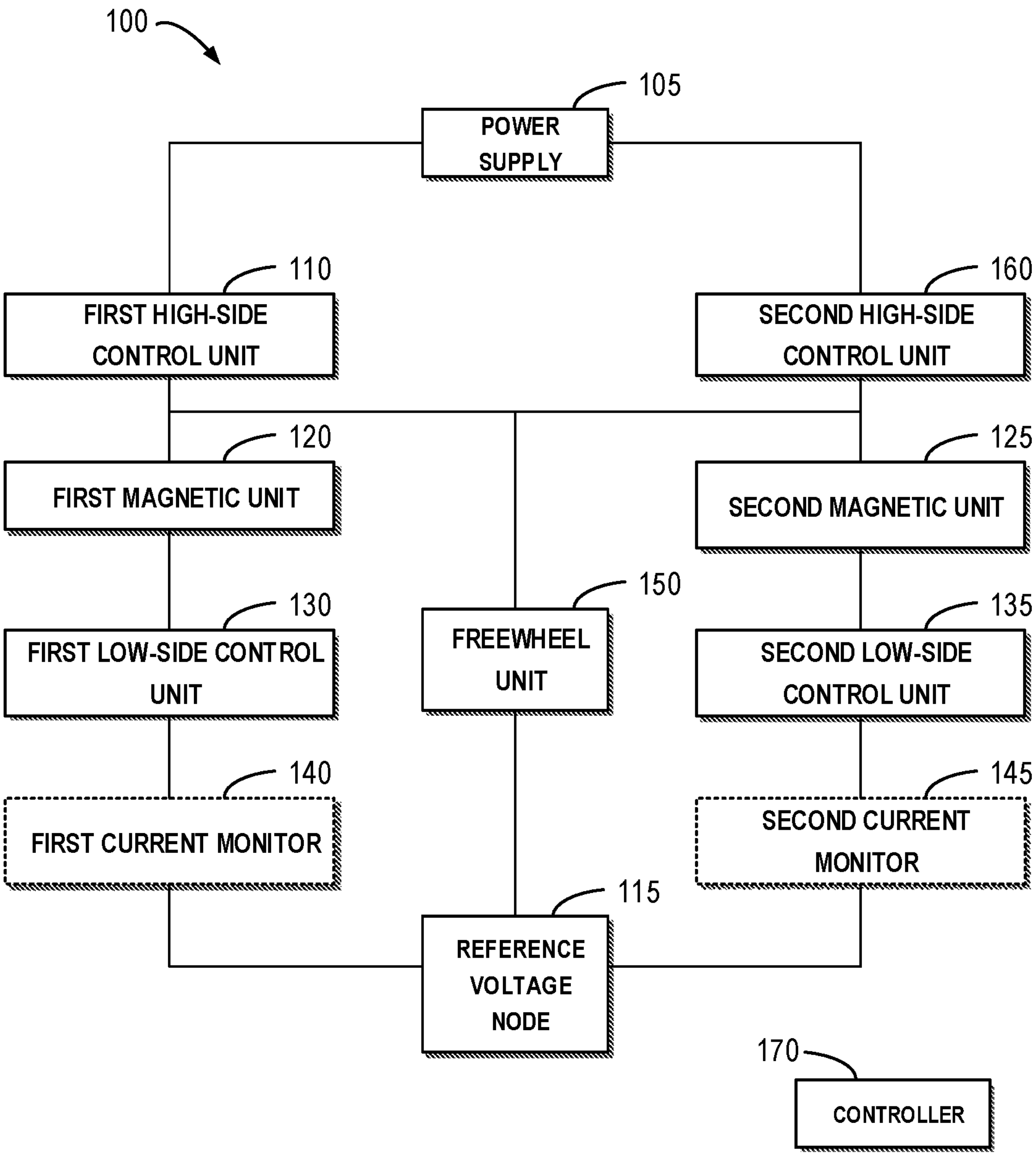
FIG. 1 shows a block diagram of a control device for a contactor according to an embodiment of the present disclosure.

The principle of the present disclosure will now be described with reference to various embodiments in the drawings. It should be understood that these embodiments are only for the purpose of enabling those skilled in the art to better understand and thereby implement the present disclosure, and are not described for the purpose of placing any limitation on the scope of the present disclosure. It should be noted that similar or identical reference signs may be used in the drawings where feasible, and similar or identical reference signs may indicate similar or identical elements. Those skilled in the art will understand that alternative embodiments of the structures and methods described herein may be adopted without departing from the principles of the present disclosure described from the following description.

As used herein, the term "includes" and its variants are to be read as open-ended terms that mean "includes, but is not limited to." The term "based on" is to be read as "based at least in part on." The term "one example implementation" and "an example implementation" are to be read as "at least one example implementation." Terms "a first", "a second" and the like may denote different or identical objects. The following text may also contain other explicit or implicit definitions.

Some example embodiments according to the present disclosure will now be described with reference to FIGS. 1 and 2. FIG. 1 shows a block diagram of a control device 100 for a contactor according to an embodiment of the present disclosure; and FIG. 2 shows a circuit diagram of the control device 100 according to an embodiment of the present disclosure.

The control device 100 according to an embodiment of the present disclosure may be used for a contactor. The contactor generally includes a first magnetic unit 120 and a second magnetic unit 125. As shown in FIG. 1, the control device 100 includes a first high-side control unit 110 and a second high-side control unit 160, the first high-side control unit 110 connects the first magnetic unit 120 of the contactor to a power supply 105, and the second high-side control unit 160 connects the second magnetic unit 125 of the contactor to the power supply 105. The control device 100 further includes a first low-side control unit 130 and a second low-side control unit 135. As shown in FIG. 1, the first low-side control unit 130 is connected between the first magnetic unit 120 and a reference voltage node 115, and the second low-side control unit 135 is connected between the second magnetic unit 125 and the reference voltage node 115.

As shown in FIG. 1, the control device 100 further includes a freewheel unit 150. The freewheel unit 150 is connected to the first magnetic unit 120 and the second magnetic unit 125. The freewheel unit 150 forms a first loop with the first magnetic unit 120 and the first low-side control unit 130, and forms a second loop with the second magnetic unit 125 and the second low-side control unit 135.

Figure 2:
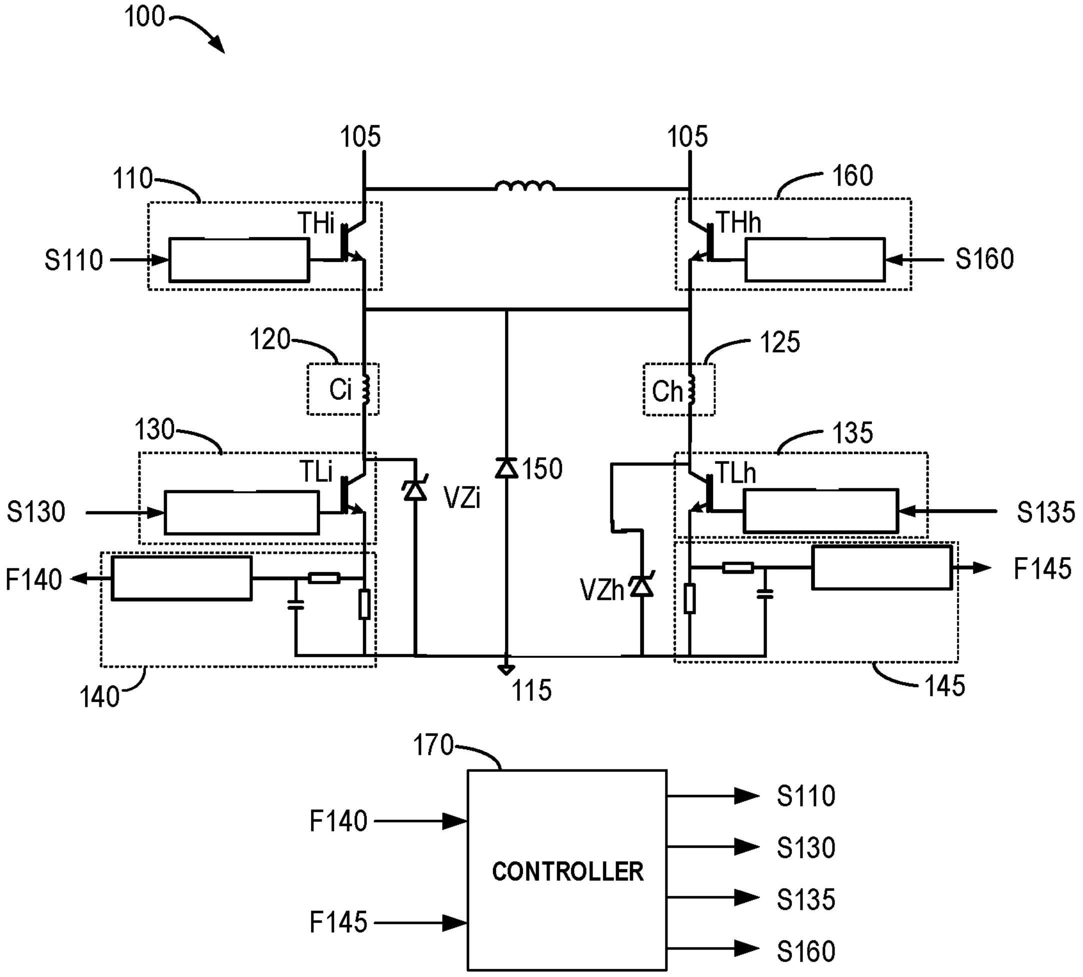
FIG. 2 shows a circuit diagram of a control device according to an embodiment of the present disclosure.

As shown in FIGS. 1 and 2, the control device 100 includes a controller 170. The controller 170 is used to control the operations of the first high-side control unit 110, the second high-side control unit 160, the first low-side control unit 130 and the second low-side control unit 135, so that in a state that at least one magnetic unit of the first magnetic unit 120 and the second magnetic unit 125 is disconnected from the power supply 105, the current of the at least one magnetic unit flows through the freewheel unit 150.

According to embodiments of the present disclosure, the magnetic unit and a magnetic core may be attracted together in a case where the power supply 105 is not needed to supply power. In this way, the power consumption of the contactor may be reduced, thereby reducing the operating cost of the contactor.

In some embodiments, as shown in FIG. 1, the control device 100 may further include a first current monitor 140. The first current monitor 140 is configured to monitor a first current flowing through the first magnetic unit 120. The controller 170 is configured to control the operation of the second low-side control unit 135 based on the first current. In an alternative embodiment, as shown in FIG. 2, if the first current is less than a threshold, the first current monitor 140 may transmit a signal F140 to the controller 170. In an alternative embodiment, in response to receiving the signal F140, the controller 170 outputs a control signal S130 to control the switch-off of the first low-side control unit 130. In this way, current detection may be implemented in a more simple manner.

In some embodiments, as shown in FIG. 1, the control device 100 may further include a second current monitor 145 configured to monitor a second current flowing through the second magnetic unit 125. The controller 170 is configured to control the operation of the second high-side control unit 160 based on the second current. In an alternative embodiment, as shown in FIG. 2, if the second current is greater than a threshold, the second current monitor 145 may transmit a signal F145 to the controller 170. In an alternative embodiment, in response to receiving the signal F145, the controller 170 outputs a control signal S160 to control the switch-on of the second high-side control unit 160.

As shown in FIG. 2, in some embodiments, the controller 170 may also output a control signal S110 to control the switch-on and switch-off of the first high-side control unit 110. In some embodiments, the controller 170 may also output a control signal S130 to control the switch-on and switch-off of the first low-side control unit 130.

As shown in FIG. 2, in some embodiments, the freewheel unit 150 may include a freewheel diode D1. As shown in FIG. 2, in some embodiments, the first high-side control unit 110 may include a high-side inrush switch THi. In some embodiments, the first low-side control unit 130 may include a low-side inrush switch TLi. In some embodiments, the first magnetic unit 120 may include an inrush coil Ci. In some embodiments, the second high-side control unit 160 may include a high-side holding switch THh. In some embodiments, the second low-side control unit 135 may include a low-side holding switch TLh. In some embodiments, the second magnetic unit 125 may include a holding coil Ch. In some embodiments, the inrush coil Ci and the holding coil Ch may be coupled to the same transformer.

As shown in FIG. 2, in some embodiments, the control device 100 may further include a first voltage stabilization protection unit VZi and a second voltage stabilization protection unit VZh. The first voltage stabilization protection unit VZi is connected between the inrush coil Ci and the reference voltage node 115, and the second voltage stabilization protection unit VZh is connected between the holding coil Ch and the reference voltage node 115. The voltage regulation protection units VZi, VZh may be used to quickly release the voltage to the reference voltage node 115. In some embodiments, the reference voltage node 115 may be ground. In some embodiments, the first voltage regulation protection unit VZi and the second voltage regulation protection unit VZh may each be a Zener diode.

Reference is made to Table 1 below to introduce a real-values sequence for the operation of the control device 100.

| Sequence | First high-side control unit 110 (THi) | Second high-side control unit 160 (THh) | First low-side control unit 130 (TLi) | Second low-side control unit (TLh) |
|---|---|---|---|---|
| Original state | 0 | 0 | 0 | 0 |
| Initialization | 0 | 0 | 1 | 0 |
| Inrush | 1 | 0 | 1 | 0 |
| Freewheel inrush | 0 | 0 | 1 | 0 |
| Induction | 0 | 0 | 1 | 1 |
| Freewheel holding | 0 | 0 | 0 | 1 |
| Holding | 0 | 1 | 0 | 1 |
| Freewheel holding | 0 | 0 | 0 | 1 |
| Fast falling | 0 | 0 | 0 | 0 |
| Diagnosis | 0 | 0 | 0 | 0 |

As shown in Table 1, when the contactor has not started to work, the first high-side control unit 110, the second high-side control unit 160, the first low-side control unit 130 and the second low-side control unit 135 are all set to 0, that is, the first high-side control unit 110, the second high-side control unit 160, the first low-side control unit 130 and the second low-side control unit 135 are all disconnected. In an initialization sequence, the first low-side control unit 130 is set to "1", which indicates that the first low-side control unit 130 is set to an "ON" state. At this time, each component in the control device 100 is initialized.

Next, in the inrush phase of the contactor, the first high-side control unit 110 is also set to "1", which indicates that the first high-side control unit 110 is set to the "ON" state. At this time, both the first high-side control unit 110 and the first low-side control unit 130 are in the "ON" state, which causes the circuit on the left side (i.e., the inrush side) in FIG. 2 to be switched on. The first magnetic unit 120 located on the inrush side may draw power from the power supply 105, and a voltage is formed on the first magnetic unit 120, so that the first magnetic unit 120 may attract together with the magnetic core (not shown) mated therewith, and the magnetic core may be moved so that the grid coupled to the contactor is switched on.

Subsequently, the controller 170 sets the first high-side control unit 110 to "0" so that it is "switched off". This causes the control device 100 to enter the freewheel phase. Since the first magnetic unit 120 is disconnected from the power supply 105, the voltage on the first magnetic unit 120 can only flow through the first low-side control unit 130 and through the freewheel unit 150 configured to be coupled to the first magnetic unit 120. Thereby, a first freewheel loop or an inrush freewheel loop are formed.

The controller 170 then sets the second low-side control unit 135 to "1", which indicates that the second low-side control unit 135 is set to the "ON" state. This enables the path of the second magnetic unit 125 and the freewheel unit 150 to be switched on. As shown in Table 1, this causes the control device 100 to enter an induction phase. The current on the freewheel unit 150 may flow through the second magnetic unit 125, thereby forming a second freewheel loop or a freewheel holding circuit on the right side (i.e., the holding side) in FIG. 2. Since the magnetic core already attracts together with the magnetic unit at this point, a small force is needed to keep the magnetic core at the attracted position. The controller 170 then sets the first low-side control unit 130 to "0", and causes it to decouple the first magnetic unit 120 from the freewheel unit 150. At this time, the circuit enters a freewheel holding phase, and there is only a freewheel loop on the holding side in the circuit. By forming the freewheel loop on the holding side, the second magnetic unit 125 may attracted together the magnetic core with a smaller power, thereby reducing the energy consumption of the contactor.

In addition, since the first high-side control unit 110 and the second high-side control unit 160 coupled to the power supply 105 are both disconnected, there is no need to consume the energy of the power supply 105. Instead, the attraction of the magnetic core may be held only through the energy on the freewheel unit 150, thereby further improving the energy-saving effect of the contactor.

Figure 3:
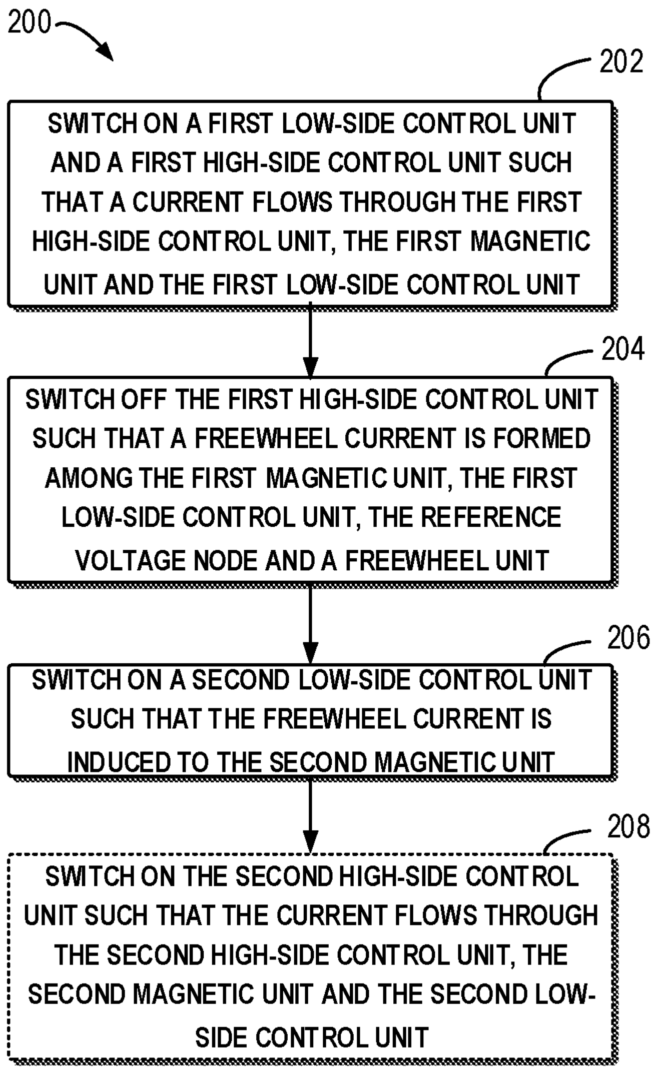
FIG. 3 shows a flow chart of a method of controlling a contactor according to an embodiment of the present disclosure.

FIG. 3 shows a flow chart of a method of controlling a contactor according to an embodiment of the present disclosure. The method 200 is performed by the controller 170 descried above.

At block 202, the first low-side control unit 130 and the first high-side control unit 110 are switched on such that the current flows through the first high-side control unit 110, the first magnetic unit 120, and the first low-side control unit 130. Referring to Table 1, the control device 100 is in the inrush phase at this time.

At block 204, the first high-side control unit 110 is switched off such that a freewheel current is formed between the first magnetic unit 120, the first low-side control unit 130, the reference voltage node 115 and the freewheel unit 150. Referring to Table 1, the control device 100 is in the freewheel inrush phase at this time.

At block 206, the second low-side control unit 135 is switched on so that a freewheel current is induced onto the second magnetic unit 125. As shown, the second low-side control unit 135 is connected between the second magnetic unit 125 and the reference voltage node 115. Referring to Table 1, the control device 100 is in the induction phase at this time.

In some embodiments, as indicated by block 208, the controller 170 may switch on the second high-side control unit 160 such that the current flows through the second high-side control unit 160, the second magnetic unit 125, and the second low-side control unit 135. The second high-side control unit 160 couples the second magnetic unit 125 to the power supply 105. Referring to Table 1, the control device 100 enters the holding phase. At this time, the circuit maintains the attraction between the magnetic core and the second magnetic unit 125 with a lower holding power, so that the control device 100 operates with a lower power.

In some embodiments, the controller 170 may switch off the first low-side control unit 130 after switching on the second low-side control unit 135. Referring to Table 1, the control device 100 is in the freewheel holding phase at this time.

In some embodiments, the first high-side control unit 110 may be switched on after the first low-side control unit 130 is switched on for a time threshold. Referring to Table 1, this is equivalent to implementing the initialization of the components before the inrush phase. This helps the voltage residual on the first magnetic unit 120 to be released to the reference voltage node 115, thereby enabling more accurate control.

In some embodiments, the first low-side control unit 130 may be switched off in response to the first current flowing through the first magnetic unit 120 being lower than the first threshold. With reference to FIG. 2, in an alternative embodiment, the monitoring of the first current may be implemented by means of the first current monitor 140 coupled to the first low-side control unit 130. If the first current is less than a certain threshold, the first current monitor 140 may transmit the signal F140 to the controller 170. In response to receiving the signal F140, the controller 170 outputs the control signal S130 to control the switch-off of the first low-side control unit 130.

In some embodiments, the second high-side control unit 160 may be switched on in response to the second current flowing through the second magnetic unit 125 being greater than a second threshold. With reference to FIG. 2, in an alternative embodiment, the monitoring of the second current may be implemented by means of the second current monitor 145 coupled to the second low-side control unit 160. If the second current is greater than a certain threshold, the second current monitor 145 may transmit the signal F145 to the controller 170. In response to receiving the signal F145, the controller 170 outputs the control signal S160 to control the switch-on of the second high-side control unit 160.

In some embodiments, a pulse width modulation signal may be used to control the first high-side control unit 110, and a duty cycle of the pulse width modulation signal may be adjusted based on the first current flowing through the first magnetic unit 120. In an alternative embodiment, a pulse width modulated signal may be used to control the second high side control unit 160 and a duty cycle of the pulse width modulated signal may be adjusted based on the second current flowing through the second magnetic unit 125.

In some embodiments, the switch-on and switch-off of the second high-side control unit 160 may be controlled periodically. By periodically controlling the switch-on and switch-off of the second high-side control unit 160, the circuit may be periodically switched between the freewheel holding phase and the holding phase. In this way, the contactor may be operated with as low power consumption as possible without affecting the attraction of the second magnetic unit 125 with the magnetic core.

In another aspect, embodiments of the present disclosure relate to a contactor. The contactor comprises the control device according to the first aspect. The contactor according to embodiments of the present disclosure consumes less power, thereby prolonging the service life and reducing the operation cost.

Although the claims in this application are drafted for specific combinations of features, it should be understood that the scope of the present disclosure also comprises any novel feature or any novel combination of features disclosed herein, explicitly or implicitly, or any generalization thereof, regardless of whether it involves the same solution in any of the claims currently claimed.

We claim:

1. A control device for a contactor, comprising:

a first high-side control unit and a second high-side control unit which respectively connect a first magnetic unit and a second magnetic unit of the contactor to a power supply;

a first low-side control unit and a second low-side control unit, the first low-side control unit being connected between the first magnetic unit and a reference voltage node, and the second low-side control unit being connected between the second magnetic unit and the reference voltage node;

a freewheel unit connected to the first magnetic unit and the second magnetic unit; and a controller for controlling operations of the first high-side control unit, the second high-side control unit, the first low-side control unit and the second low-side control unit, so that in a state that at least one magnetic unit of the first magnetic unit and the second magnetic unit is disconnected from the power supply, a current of the at least one magnetic unit flows through the freewheel unit.

2. The control device of claim 1, further comprising:

a first current monitor configured to monitor a first current flowing through the first magnetic unit, the controller being configured to control the operation of the second low-side control unit based on the first current.

3. The control device of claim 2, further comprising:

a second current monitor configured to monitor a second current flowing through the second magnetic unit, the controller being configured to control the operation of the second high-side control unit based on the second current.

4. The control device of claim 1, wherein the controller is configured to switch on the first low-side control unit during an inrush phase of the contactor so that the current flows through the first magnetic unit and the first low-side control unit.

5. The control device of claim 1, wherein the controller is configured to switch on the second low-side control unit during a holding phase of the contactor so that the current flows through the second magnetic unit and the second low-side control unit.

6. The control device of claim 1, wherein the freewheel unit comprises a freewheel diode.

7. The control device of claim 1, wherein the first high-side control unit comprises a high-side inrush switch;

the first low-side control unit comprises a low-side inrush switch;

the first magnetic unit comprises an inrush coil;

the second high-side control unit comprises a high-side holding switch;

the second low-side control unit comprises a low-side holding switch; and the second magnetic unit comprises a holding coil.

8. The control device of claim 7, further comprising a first voltage stabilization protection unit and a second voltage stabilization protection unit, the first voltage stabilization protection unit is connected between the inrush coil and the reference voltage node, and the second voltage stabilization protection unit is connected between the holding coil and the reference voltage node.

9. A contactor, comprising a control device of claim 1.

10. A method of controlling a contactor, the contactor comprising a first magnetic unit and a second magnetic unit, the method comprising:

switching on a first low-side control unit and a first high-side control unit such that a current flows through the first high-side control unit, the first magnetic unit and the first low-side control unit, wherein the first high-side control unit connects the first magnetic unit to a power supply, and the first low-side control unit is connected between the first magnetic unit and a reference voltage node;

switching off the first high-side control unit such that a freewheel current is formed among the first magnetic unit, the first low-side control unit, the reference voltage node and a freewheel unit, wherein the freewheel unit is connected to the first magnetic unit and the second magnetic unit; and switching on a second low-side control unit such that the freewheel current is induced to the second magnetic unit, wherein the second low-side control unit is connected between the second magnetic unit and the reference voltage node.

11. The method of claim 10, further comprising:

switching off the first low-side control unit after switching on the second low-side control unit.

12. The method of claim 11, further comprising:

switching on a second high-side control unit after switching off the first low-side control unit, wherein the second high-side control unit is used to connect the second magnetic unit of the contactor to the power supply.

13. The method of claim 12, wherein switching on the second high-side control unit comprises:

switching on the second high-side control unit in response to a second current flowing through the second magnetic unit being greater than a second threshold.

14. The method of claim 10, wherein the first magnetic unit comprises an inrush coil;

the second magnetic unit comprises a holding coil;

the first low-side control unit comprises a low-side inrush switch;

the first high-side control unit comprises a high-side inrush switch;

the second low-side control unit comprises a low-side holding switch; and the freewheel unit comprises a freewheel diode.

15. The method of claim 10, wherein switching on the first low-side control unit and the first high-side control unit comprises:

switching on the first high-side control unit after switching on the first low-side control unit for a time threshold.

16. The method of claim 10, wherein switching off the first low-side control unit comprises:

switching off the first low-side control unit in response to a first current flowing through the first magnetic unit being lower than a first threshold.

17. The method of claim 12, wherein the second high-side control unit comprises a high-side holding switch.

* * * * *